United States Patent [19]

Conibear

[11] 4,146,990

[45] Apr. 3, 1979

[54] SAFETY CATCH

[75] Inventor: Frank Conibear, Victoria, Canada

[73] Assignee: Woodstream Corporation, Lititz, Pa.

[21] Appl. No.: 764,856

[22] Filed: Feb. 2, 1977

[30] Foreign Application Priority Data

Nov. 23, 1976 [CA] Canada ................................... 266323

[51] Int. Cl.² ........................................... A01M 23/24
[52] U.S. Cl. ........................................... 43/88; 43/96
[58] Field of Search ................... 43/81 S, 88–97; 292/210; 49/449, 394; 24/252, 73 C, 81 C, 73 HH, 73 CP, 73 SA, 84 C, 115 N, 131 C; 16/192, 139, 146, 147

[56] References Cited

U.S. PATENT DOCUMENTS

| 750,782 | 1/1904 | Ramsey | 24/131 C |
|---|---|---|---|
| 873,027 | 12/1907 | Davis | 24/131 C |
| 1,633,792 | 6/1927 | Pete | 24/131 C |
| 1,711,419 | 4/1929 | Loofbourrow | 24/73 C |

FOREIGN PATENT DOCUMENTS

| 12694 | 2/1925 | Netherlands | 24/73 C |
|---|---|---|---|
| 12954 of | 1898 | United Kingdom | 43/90 |

*Primary Examiner*—Nicholas P. Godici
*Attorney, Agent, or Firm*—Holman & Stern

[57] ABSTRACT

A safety catch for a rotating frame animal trap of round wire stock. The trap has two similar frames each frame having jaw forming sides and ends extending between the sides to support the jaws. The catch comprises a helix of an internal diameter about equal to the external diameter of the round wire stock of the frame so that the helix can fit around a first frame of the trap. The spacing of the coils of the helix is at least equal to the diameter of the wire stock. A hook extending outwardly from the helix to be able to engage, when the catch is in its useful position on a set trap, the second frame of the trap to prevent rotation of the frames. The catch is easy to install, even in a manufactured trap, unlike prior art safety catches.

3 Claims, 1 Drawing Figure

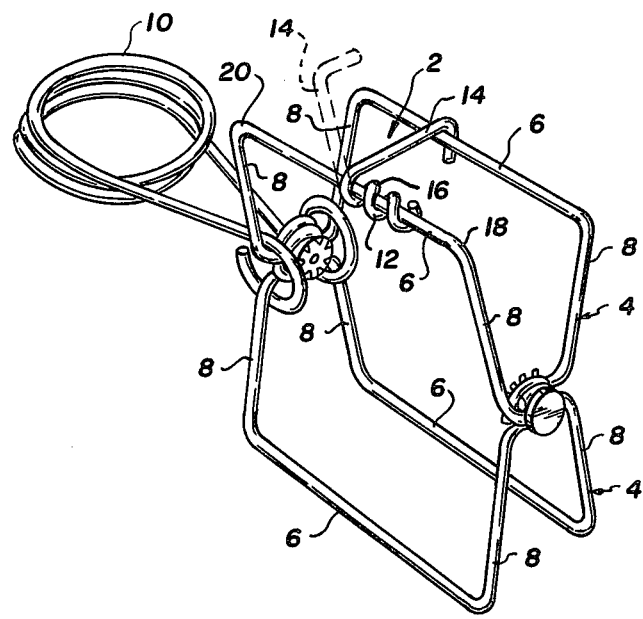

SAFETY CATCH

FIELD OF INVENTION

This invention relates to a safety catch for a rotating frame animal trap.

DESCRIPTION OF PRIOR ART

Rotating frame animal traps, for example as described in my U.S. Pat. No. 3,010,245 issued on Nov. 28, 1961, are the best known of humane animal traps. The traps have two similar rotating frames, usually of round wire stock, each having first and second jaw-forming sides that lie in a common plane. First and second ends extend between the jaw forming sides to support the jaws. These ends each have a central portion in which the frames are pivotally connected through adjacent ends for rotation about a common axis between a set position and a closed position. Outer portions on each side of the central portion extend to the jaws. The rotating frame animal traps have a trigger for releasably maintaining the trap in the set position. The traps are also provided with at least one actuator capable of rapidly and forcefully rotating the frames. Such an actuator typically has two arms spring biased at one end so that the other ends, which terminate in rings encircling adjacent ends of both frames on opposite sides of the common axis would, if unobstructed, move apart to a distance substantially greater than the length of the frames ends. The traps are actuated by an animal contacting the trigger and thus releasing the trap from the set pos-ition. The frames rapidly rotate about the common axis and the jaw-forming sides strike the body of the animal at a vital part, typically about the lungs or heart, causing, in the ideal, substantially instant death.

The traps are designed to kill as rapidly as possible. Other traps, for example the leg hold trap, hold the animal until it dies of exposure or starvation.

Animal traps can pose problems for trappers. Trapping is often carried out in remote areas and there have been instances of trappers being caught in their own traps and dying of exposure. A particularly dangerous situation is where both hands of the trapper are caught in a trap while the trap is being set. In an attempt to avoid this problem traps are often provided with a variety of safety means. Typically the triggers means on a rotating frame trap is provided with a safety means that keeps the trap in the set position. Thus the trigger can be held in a safe position while the trap is positioned. When it is positioned to the satisfaction of the trapper the trigger is moved to the set position. However, a disadvantage of safety systems on the trigger is that it is normally necessary to put the fingers in a dangerous position when, for example, moving the trigger from the safe to the set position. A solution to this problem is to have a safety system in the form of a safety catch-usually positioned on the frame of the trap-and adjustable between the safe and the set position without putting the fingers in the trap. Typically a rotating frame animal trap will have both systems, that is a safety system associated with the trigger and a safety system associated with the frames.

SUMMARY OF INVENTION

The present invention seeks to provide a safety catch positionable on one of the frames of a rotating frame trap to extend to engage the other frame. An advantage of the safety catch of the present invention is its simplicity of operation and, particularly, its simplicity of positioning on the trap and its replacement even on a completed trap. In the prior art safety catches it has often been difficult to replace a broken catch, particularly in the field. However, the present invention provides a safety catch that can be easily removed by deliberate action but is not easily removed inadvertently.

Accordingly the present invention is a safety catch for a rotating frame animal trap of round wire stock having two similar frames, each having jaw-forming sides and ends extending there between to support said jaws, the catch comprising a helix of an internal diameter about equal to the external diameter of the round wire stock of the frame to engage on a first frame of the trap, the spacing of the coils of the helix being at least equal to the diameter of the wire stock, a hook extending outwardly from the helix to to be able to engage, when the catch is in its useful position on a set trap, the second frame of the trap to prevent rotation of the frames.

Desirably the internal diameter of the helix is slightly less than the diameter of the stock so that the safety catch is frictionally retained in any desired position on the first frame. This prevents the catch slipping back from the set position to the safe position. Desirably the safety catch is formed in one piece and may be of relatively soft round wire stock, with the hook extending outwardly from one end of the helix.

BRIEF DESCRIPTION OF DRAWING

The invention is illustrated, merely by way of example, in the accompanying drawing which is a perspective view of a rotating frame animal trap, without the trigger means, fitted with a safety catch according to the present invention.

DESCRIPTION OF PREFERRED EMBODIMENT

The drawings illustrate a safety catch 2 positioned on a rotating frame animal trap of round wire stock comprising two similar frames 4 each having jaw-forming sides 6 and ends 8 extending between the jaw forming sides 6 to support the jaw forming sides 6. The trap is provided with an actuator 10 which, upon release of the trigger (not shown) causes a rotation of the frames 4 from the set position shown in the FIGURE to a position in which the jaw forming sides 6 can trap an animal between them. Of course it is necessary that the safety to be moved to the set position—shown in dotted lines in the drawings—before that is possible. Furthermore, it is necessary that the trap be released by operation of the trigger mechanism which is not shown in the drawing. Any trigger that is useful with a rotating frame trapping may be used. The safety catch 2 comprises a helix 12 having an internal diameter about equal to the diameter of the round wire stock of the frames 4. The helix 12 engages on one of the frames 6. The safety catch 2 has a hook 14 extending outwardly from the helix 12 to be able to engage, when the trap is in the set position, on the other frame 4. As will be appreciated from the drawings when the catch 2 is in the solid line position shown in the drawing the frames 4 cannot rotate from the position shown under the influence of the actuator 10.

The particular feature of the present invention that is of particular value is that the coils 16 of the helix 12 are spaced from each other by distance about equal to the diameter of the wire stock. This means that in the illustrated trap the catch 2 can be threaded onto the jaw forming side 6 at corner 18 or corner 20. It can, of course, be threaded on similarly at any of the corners of the frame 4 between the jaw forming sides 6 and the ends 8. The illustrated position is probably the preferred position. That is the safety catch 2 is on the top of the trap and the hook 14 opens downwardly. However, particularly when, as in the preferred embodiment, the helix 12 is at close frictional fit on a jaw forming side 6 the hook 14 can equally open upwardly. Whether the hook 14 opens upwardly or downwardly normally depends upon which corner, 18 or 20 the safety catch 2 is threaded onto the jaw forming side 6.

It will be appreciated with the helical structure of the safety catch and, particularly, with the spacing of the coils 16 of the helix 12 being equal to the diameter of the round wire stock used to make the frames 4 the illustrated safety catch 2 can be added to a trap at any time, during or after manufacturer. Furthermore, the removal of the safety catch, at least when it is desired to remove it deliberately, is a simple matter, as is its replacement.

The safety catch 2 is desirably made of a relatively soft metal. However, it need not even be made of metal. It can, for example, be made of a plastic material.

In the illustrated embodiment the hook 14 extends outwardly from one end of the helix 12 but this is not necessary. The hook 14 could be formed separately and welded to a coil 16 of the helix 12. However, the illustrated embodiment is particularly simple to produce from one continuous piece of material, for example round wire stock, and is preferred for this reason.

Thus the safety catch of the present invention is a device that, in its safety function, is as effective as any other safety catch and yet has the advantage of being easily replaced if broken or worn.

I claim:

1. In combination, a rotating frame animal trap of round wire stock, the trap having two similar frames each frame having jaw forming sides and ends extending between the sides to support the jaws, and a safety catch comprising:

a helix of an internal diameter about equal to the external diameter of the round wire stock of the frame, the helix fitting around a first frame of the trap, the spacing of the coils of the helix being at least equal to the diameter of the wire stock; and a hook extending outwardly from the helix for engaging the second frame of the trap to prevent rotation of the frames.

2. A combination as claimed in claim 1 in which the internal diameter of said helix is only slightly greater than the external diameter of the round wire stock so that the safety catch can be frictionally retained in any desired position on the first frame.

3. A combination as claimed in claim 1 wherein said safety catch is formed from one piece, with the hook extending outwardly from one end of the helix.

* * * * *